United States Patent
Kim et al.

(10) Patent No.: US 12,482,268 B2
(45) Date of Patent: Nov. 25, 2025

(54) DATA CONSTRUCTION AND LEARNING SYSTEM AND METHOD BASED ON METHOD OF SPLITTING AND ARRANGING MULTIPLE IMAGES

(71) Applicant: Electronics and Telecommunications Research Institute, Daejeon (KR)

(72) Inventors: Jin Woo Kim, Daejeon (KR); Ki Tae Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 432 days.

(21) Appl. No.: 17/981,933

(22) Filed: Nov. 7, 2022

(65) Prior Publication Data

US 2023/0146228 A1    May 11, 2023

(30) Foreign Application Priority Data

Nov. 9, 2021  (KR) .......................... 10-2021-0153298
Aug. 9, 2022  (KR) .......................... 10-2022-0099345

(51) Int. Cl.
  *G06T 7/73*    (2017.01)
  *G06T 5/50*    (2006.01)
  (Continued)

(52) U.S. Cl.
  CPC ............... *G06V 20/56* (2022.01); *G06T 5/50* (2013.01); *G06V 10/759* (2022.01); *G06T 2207/20221* (2013.01); *G06V 2201/07* (2022.01)

(58) Field of Classification Search
  CPC ............. G06T 5/50; G06T 2207/20221; G06T 2207/20081; G06T 2207/20084;
  (Continued)

(56) References Cited

U.S. PATENT DOCUMENTS 10,692,262 B2 *  6/2020  Lim ..................... H04N 23/698
2012/0163671 A1  6/2012  Choi et al.
(Continued)

FOREIGN PATENT DOCUMENTS

EP           3163506 A1 *  5/2017  ............... B60R 1/00
KR   10-2020-0027425       3/2020
(Continued)

OTHER PUBLICATIONS

Li, Detection of Road Objects With Small Appearance in Images for Autonomous Driving in Various Traffic Situations Using a Deep Learning Based Approach, IEEE Access, Digital Object Identifier 10.1109/ACCESS.2020.3036620, Dec. 7, 2020 (Year: 2020).*

(Continued)

*Primary Examiner* — Vu Le
*Assistant Examiner* — Lei Zhao
(74) *Attorney, Agent, or Firm* — KILE PARK REED & HOUTTEMAN PLLC

(57) ABSTRACT

The present disclosure relates to a data construction and learning system and method based on a method of splitting and arranging multiple images. The data construction and learning system based on a method of splitting and arranging multiple images includes an input unit configured to receive images captured by a plurality of cameras disposed in a vehicle, a memory in which a program for merging the images into a single image and estimating information on a road situation and an object has been stored, and a processor configured to execute the program. The processor merges and recognizes, as one situation, road situations and objects redundantly included in the images.

7 Claims, 10 Drawing Sheets

(51) Int. Cl.
*G06V 10/75* (2022.01)
*G06V 20/56* (2022.01)

(58) Field of Classification Search
CPC ............ G06T 2207/30261; G06T 7/73; G06V 10/759; G06V 2201/07; G06V 10/16; G06V 10/803
See application file for complete search history.

(56) References Cited

U.S. PATENT DOCUMENTS

2013/0211656 A1  8/2013  An et al.
2025/0022144 A1* 1/2025  Feng .................. G06T 1/60

FOREIGN PATENT DOCUMENTS

| KR | 10-2020-0095357 | 8/2020 |
| KR | 10-2021-0018434 | 2/2021 |
| KR | 10-2021-0128424 | 10/2021 |
| KR | 10-2342945 | 12/2021 |

OTHER PUBLICATIONS

Venkateswara, Deep-Learning Systems for Domain Adaptation in Computer Vision, IEEE Signal Processing Magazine, Nov. 2017 (Year: 2017).*

Heng, Project AutoVision: Localization and 3D Scene Perception for an Autonomous Vehicle with a Multi-Camera System, 2019 International Conference on Robotics and Automation (ICRA), Palais des congres de Montreal, Montreal, Canada, May 20-24, 2019 (Year: 2019).*

* cited by examiner

DATA CONSTRUCTION AND LEARNING SYSTEM AND METHOD BASED ON METHOD OF SPLITTING AND ARRANGING MULTIPLE IMAGES

CROSS-REFERENCE TO RELATED APPLICATIONS

This application claims priority to and the benefit of Korean Patent Application No. 10-2021-0153298, filed on Nov. 9, 2021, and Korean Patent Application No. 10-2022-0099345, filed on Aug. 9, 2022, the disclosures of which are incorporated herein by reference in their entirety.

BACKGROUND

1. Technical Field

The present disclosure relates to a data construction and learning system and method based on a method of splitting and arranging multiple images.

2. Related Art

Global automakers propose various autonomous driving recognition technologies by merging a camera, a LiDAR, a radar, an ultrasonic sensor, etc. A specific company makes secure the position of a leading company by proposing an omni-directional recognition-based autonomous driving technology through only camera recognition.

A method of processing a plurality of images independently in parallel or sequentially has problems in terms of time delay, synchronization, and a processing load. A method of individually recognizing and merging objects by using a plurality of images has a problem in that it is difficult to identify and merge the same object.

SUMMARY

Various embodiments are directed to providing a recognition technology for autonomous driving, which solves a problem with a multi-camera and multi-sensor convergence method (e.g., an error which may occur upon synchronization or mergence) and which is more efficient, has a high processing speed and high accuracy using only the input of multiple mono-camera images, compared to a conventional stereo method/multi-sensor convergence method.

An embodiment of the present disclosure proposes a recognition technology for autonomous driving through a data construction in which images obtained from multiple cameras can be rearranged and extended. Specifically, an embodiment of the present disclosure proposes an artificial intelligence data construction and learning technology capable of simultaneously recognizing images received from a plurality of cameras mounted on an autonomous driving system depending on a recognition range and purpose in the autonomous driving system and more accurately and efficiently recognizing a moving object and driving situation within all ranges necessary for driving, including all directions or parts, a short distance, and a long distance.

In an embodiment, a data construction and learning system based on a method of splitting and arranging multiple images includes an input unit configured to receive images captured by a plurality of cameras disposed in a vehicle, a memory in which a program for merging the images into a single image and estimating information on a road situation and an object has been stored, and a processor configured to execute the program. The processor merges and recognizes, as one situation, road situations and objects redundantly included in the images.

The input unit receives images having different field of views (FOVs) from the plurality of cameras.

The processor constructs the single image in which the images are disposed for each section by rearranging and merging the images having the different FOVs.

The processor constructs data to be delivered in a learning level in a way to merge and manage information of an object that is partially displayed for each section and whose region of interest (ROI) is fully displayed and becomes relatively small by performing annotation on the object within the single image.

The processor constructs structural data of objects within images by using the single image and calibrated information based on a distance sensor and a position sensor. The structural data includes information of an object, a model, a class, a position, heading, a size, and a target.

The processor merges the images into the single image including an image main sector and an image sub-sector, and outputs the final estimation information based on only a merged image input upon real-time execution by using learning results using the structural data of the objects within the images.

In another embodiment, a data construction and learning method based on a method of splitting and arranging multiple images includes steps of (a) obtaining image data photographed by a plurality of cameras, (b) merging the image data into a single frame having a tile array, (c) converting, into an image domain, object information labeled on an object within the single frame, and (d) generating learning data by merging an image converted into the image domain and labeling information of the image domain.

The step (a) includes obtaining the image data from the plurality of cameras whose photographing information has been set so that the cameras have different field or views (FOVs) and resolution.

The step (b) includes constructing the data capable of being delivered in a learning level by merging and managing an object partially displayed in the single frame for each section, information of a region of interest (ROI) displayed in a complete form, and information of an object that is disposed at a long distance and that has a relatively small ROI.

The step (c) includes converting, into the image domain, the object information including object coordinate information in a birds' eye view, form modeling information corresponding to an object size, and moving direction information.

The step (d) includes performing learning by using structural data of objects within images including information of an object, a model, a class, a position, heading, a size, and a target.

According to the present disclosure, in an artificial intelligence-based recognition technology for efficiently merging various FOVs and resolution of a plurality of cameras, it is possible to recognize objects included in multiple images of redundant ranges by merging the objects into one object and to more efficiently recognize, at a short distance, an object at a long distance.

The present disclosure has an effect in that it can extend a range of autonomous driving and improve reliability of autonomous driving by simultaneously efficiently recognizing images obtained from a plurality of cameras capable of high-speed processing through mergence and convergence without using a radar or a LiDAR-based autonomous driving recognition method according to a conventional technology.

Effects of the present disclosure are not limited to the aforementioned effects, and other effects not described above may be evidently understood by a person having ordinary knowledge in the art to which the present disclosure pertains from the following description.

DETAILED DESCRIPTION

Figure 1:
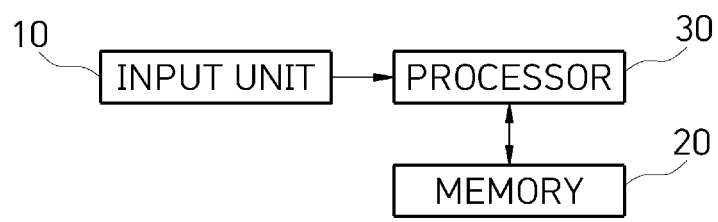
FIG. 1 illustrates a data construction and learning system based on a method of splitting and arranging multiple images according to an embodiment of the present disclosure.

The aforementioned object, other objects, advantages, and characteristics of the present disclosure and a method for achieving the objects, advantages, and characteristics will be clearly described through the following embodiments with reference to the accompanying drawings.

However, the present disclosure is not limited to embodiments disclosed hereinafter, but may be implemented in various different forms. The following embodiments are merely provided to easily notify a person having ordinary knowledge in the art to which the present disclosure pertains of an object, construction, and effect of the present disclosure. The scope of right of the present disclosure is defined by the category of the claims.

Terms used in this specification are used to describe embodiments and are not intended to limit the present disclosure. In this specification, an expression of the singular number also includes an expression of the plural number unless clearly defined otherwise in the context. The term "comprises" and/or "comprising" used in this specification does not exclude the presence or addition of one or more other components, steps, operations and/or devices in addition to mentioned components, steps, operations and/or elements.

Recently, as a technology for an autonomous driving system develops into Level 4 or more, representatively, Tesla Inc. improves autonomous driving performance by performing 360-degree omni-directional recognition through only camera recognition, extending a data structure necessary for autonomous driving, such as lane keeping and a lane change, and continuously learning data. Furthermore, in the case of recognition using eight cameras, image data from the eight cameras is secured through a parallel or sequential recognition method. Huge investments are made in order to secure a more elaborate autonomous driving technology by recognizing the location and type of a moving object, a lane, and infrastructure by using a deep learning technology. In line with the aforementioned technology development trend of the representative leading company, a recognition technology using only several cameras is initiatively developed.

A method of processing a plurality of images independently in parallel or sequentially has a time delay problem, a synchronization problem, and a problem with a processing load in a process of processing the images. That is, a method of individually recognizing an object by using a plurality of images and merging the results of the recognition has a problem with a process of identifying and merging the same object.

Hereinafter, prior to the description of a data construction and learning system and method based on a method of splitting and arranging multiple images according to an embodiment of the present disclosure, i) advantages/disadvantages of a recognition technology based on a single image having a high field of view (FOV) and resolution and ii) advantages/disadvantages of a recognition technology based on images of a plurality of (e.g., three) cameras, which can secure long distance/middle distance/short distance views are described.

A front driving environment upon autonomous driving is described as an example. It is efficient in terms of hardware and software to recognize a front object (e.g., an obstacle or a target) with a wide FOV in a short distance and a narrow FOV in a long distance. For a comparison between characteristics of the technologies, a case in which cameras are driven in the same hardware is assumed and described.

i) The recognition technology based on a single image having a high FOV and resolution has advantages in that 1) it is efficient because the recognition of an object is processed by using one camera image and 2) it does not have a problem upon synchronization and mergence, which occurs in a process of processing a plurality of images, because a single image is used, but has disadvantages in that 1) the range of an error is large when a distance/position is estimated based on a long distance image because the number of securable pixels corresponding to an object is small as the distance from the object is increased, 2) high-performance CPU/GPU are required because resolution of the camera is high, 3) there is a problem in that an error is increased upon distance/position estimation and sensor convergence based on a single image because a distortion of the side/top and bottom of an image is large, and 4) there are problems in that the number of deep learning network layers is increased in order to detect a small object and a real-time processing speed is relatively low although the same hardware is used because the size of an input image is large upon learning.

ii) The recognition technology based on images of three cameras, which can secure long distance/middle distance/short distance views has advantages in that 1) it is possible to accurately recognize an object in a wide range from a short distance to a long distance by using three cameras having low resolution, 2) a middle distance and a long distance can be more accurately estimated because a distortion of an image is small by using a lens having a small FOV, 3) an error of an object at a middle distance or higher can be excluded because only the results of the recognition of an object having a small distortion portion are used by using a lens having a large FOV in the case of a short distance, and 4) an error range upon distance/position estimation based on a long distance image is small because a large range of pixels corresponding to an object is secured based on a small FOV although the object is placed at a long distance, but has disadvantages in that 1) there is a parallel processing and synchronization problem because three cameras are required and 2) there are a delay problem between the cameras upon sequential processing and a problem in that information on the same object upon merging may be different (e.g., an error and tracking ID problem upon distance estimation based on a mono camera).

A projection method using a mutual location relation between an image and a distance sensor based on sensor convergence information, a method of estimating a 3-D object based on a LiDAR, and a distance estimation method using a stereo method have been proposed as a technology for estimating three-dimensional (3-D) location information of an object from an image, but such methods have the following differences according to an embodiment of the present disclosure.

According to an embodiment of the present disclosure, information on a road situation and an object is estimated by merging, into a single image, information of several cameras installed in an autonomous vehicle based on their purposes and features and recognizing several situations by using only one deep learning network.

Embodiments of the present disclosure propose a method of merging and recognizing, as one situation, objects and road situations that are redundantly included in images obtained from several cameras, a method of constructing a deep learning network for merging information of an object necessary for autonomous driving based on the method of merging and recognizing, as one situation, objects and road situations, and a structure of data to be input to the deep learning network and a processing method thereof.

According to an embodiment of the present disclosure, one image (or split array image) merged in the form of a tile array of multiple cameras and movable object information labeled on an object that is present in the one image are converted into an image domain. The object information includes object coordinate information in a birds' eye view, form modeling information corresponding to the size of the object, and moving direction information. Images are constructed as one (one frame) data by merging, into artificial intelligence learning data, labeling information of an image domain and the images converted into the image domain. The constructed data experiences a learning process in order of a multi-deep learning network (detection→comparing-→merge→estimation) for estimating a driving situation and object information by taking into consideration a relation between a single image and two consecutive images.

According to an embodiment of the present disclosure, an object is accurately recognized in a wide range from a short distance to a long distance by using a plurality of (three) cameras having low resolution specifications. The present disclosure proposes a method capable of processing using one camera image, and has high efficiency and does not have problems in the synchronization and mergence of the aforementioned conventional technology. The present disclosure has advantages in that the number of deep learning network layers does not need to be many in order to detect a small object and a real-time processing speed is relatively high on the basis of the same hardware because the size of an input image is small upon learning. Furthermore, the present disclosure proposes a method of adding and rearranging a desired image (or data) to a single (or one sheet of) image.

In this case, it is possible to extend a section (an ID assigned to identify one image) and change a structure of an image (or data) (e.g., long distance to short distance information: the front, a side, the rear, a traffic light, or a small object). The present disclosure has an advantage in that several types of data can be processed as single (or one sheet of) data at once through deep learning. In the case of learning data structuralization, it is possible to determine the same object that is recognized in different scenes from a long distance to a short distance by using a plurality of cameras (in an embodiment of the present disclosure, three cameras are assumed and described, but the number of cameras may be changed depending on their features) that photographs the front and to assign the same object tracking ID to the determined same object. The present disclosure has characteristics in that learning is performed based on a mono camera and sensor convergence data and only a camera is used for an actual execution (i.e., inference) structure (e.g., a radar, a LiDAR, etc. are used for only a data construction upon learning). Furthermore, the present disclosure has an advantage in that distance/location/size/tracking/direction information can be estimated based on only image data input.

FIG. 1 illustrates a data construction and learning system based on a method of splitting and arranging multiple images according to an embodiment of the present disclosure.

The data construction and learning system based on a method of splitting and arranging multiple images according to an embodiment of the present disclosure may include an input unit 10 configured to receive images captured by a plurality of cameras disposed in a vehicle, a memory 20 in which a program for merging images into a single image and estimating information on a road situation and an object is stored, and a processor 30 configured to execute the program. The processor 30 merges and recognizes, as one situation, road situations and objects that are redundantly included in images.

The input unit 10 receives images having different FOVs from the plurality of cameras. Alternatively, the input unit 10 receives images having different FOVs and resolution from the plurality of cameras.

The processor 30 constructs a single image by rearranging and merging images. The images are disposed in the single image for each section.

The processor 30 constructs data to be delivered in a learning level in a way to merge and manage information of an object that is partially displayed for each section and whose region of interest (ROI) is fully displayed and becomes relatively small by performing annotation on the object within a single image.

The processor 30 constructs structural data of objects within images by using a single image and calibrated information based on a distance sensor and a position sensor. The structural data includes object, model, class, position, heading, size, target information, etc.

The processor 30 merges images into a single image including an image main sector and an image sub-sector, and outputs the final estimation information as only an image input merged upon real-time execution by using learning results using the structural data of the objects within the images.

Figure 2:
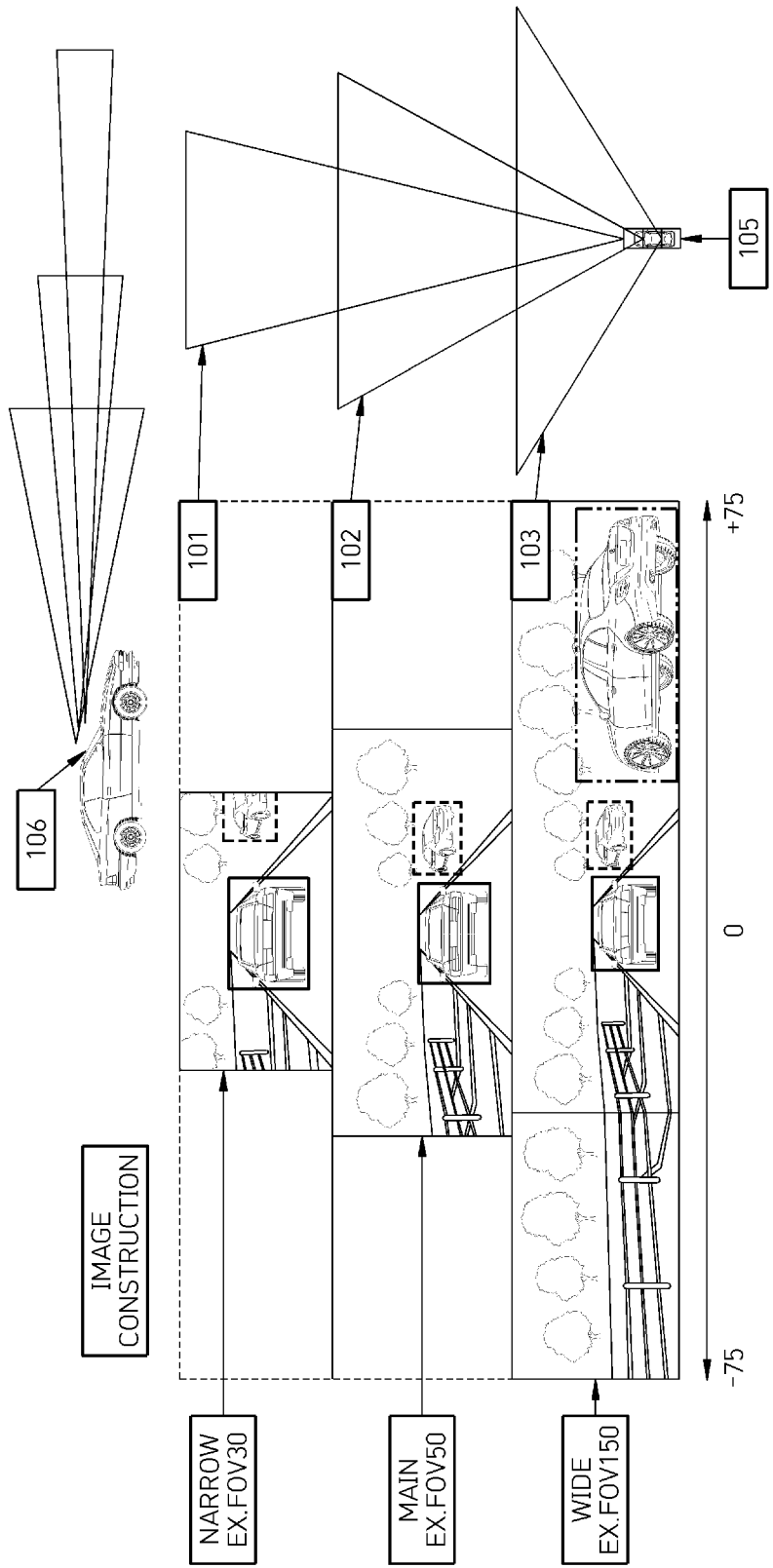
FIG. 2 illustrates a multi-camera rearrangement data structure according to an embodiment of the present disclosure.

FIG. 2 illustrates a multi-camera rearrangement data structure according to an embodiment of the present disclosure. A merged image construction process is described below with reference to FIG. 2.

As illustrated in FIG. 2, one data merged in the form of a tile array of multiple cameras according to an embodiment of the present disclosure is in a form of a sheet of data that has been rearranged and merged from images of several cameras based on their purposes and features. The data is constructed in a form having information of each section (illustrated as 101, 102, and 103 in FIG. 2).

A merged image is constructed so that several images having different camera FOVs, locations, resolution, and distortion information depending on their purposes are disposed in the sections 101, 102, and 103, respectively.

The detailed description of the present disclosure is given on the basis of a front range of an autonomous vehicle. An embodiment of the present disclosure proposes a method of processing/constructing deep learning data having a platform format, which can rearrange various images of a traffic light, a rear side, the rear, etc.

Referring to FIG. 2, three images which may be used in an autonomous driving or driving-assistant system and which have different FOVs and resolution are described as an example. The cameras may be disposed transversely and longitudinally on the basis of a virtual reference point. In a construction form of the cameras, the images are constructed so that an image having a relatively narrow FOV is disposed on the upper side of the images and an image having a sequentially great FOV is disposed on the lower side of the images.

An image corresponding to the first section 101 is an image having a small FOV and is a photographed image of a long distance range. An image corresponding to the second section 102 is a photographed image of middle/short distance ranges, which plays a role as the center of the three images. An image corresponding to the third section 103 is an image having a large FOV and is a photographed image of a short distance range.

In the form in which the three images are merged into one image, data is constructed so that the data is delivered in a learning level by merging and managing a vehicle (a yellow utility vehicle) partially displayed in the first section 101, a form of a vehicle displayed in a complete form having a great ROI (i.e., a region in which an object is labeled) in the second section 102, and information that corresponds to the same object, but has a relatively small ROI compared to the second section 102, in the third section 103 through annotation (or labeling) for each object.

Figure 3A:
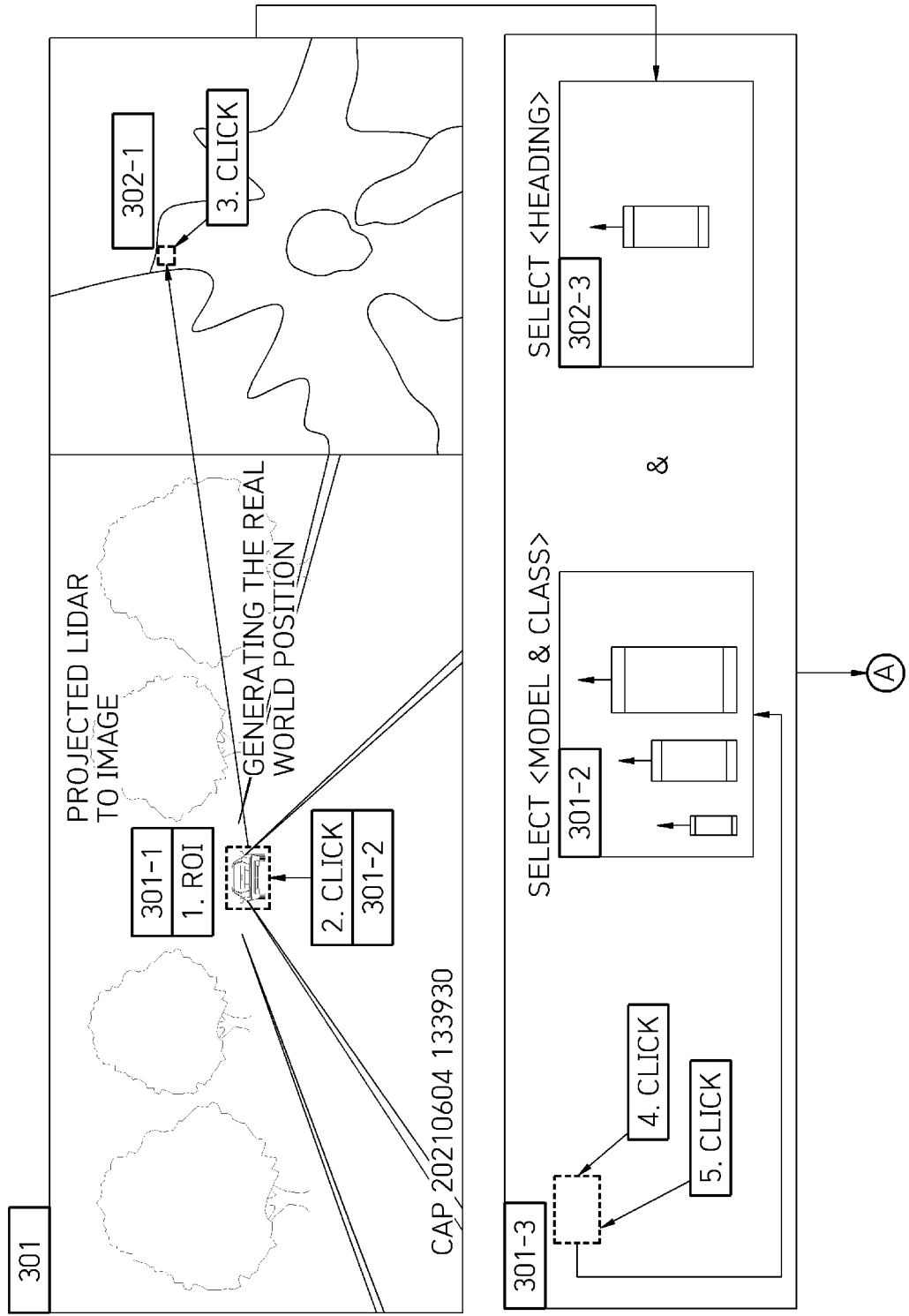
FIGS. 3A and 3B illustrate a multi- and various-sensor mergence tile type data processing process according to an embodiment of the present disclosure.
Figure 3B:
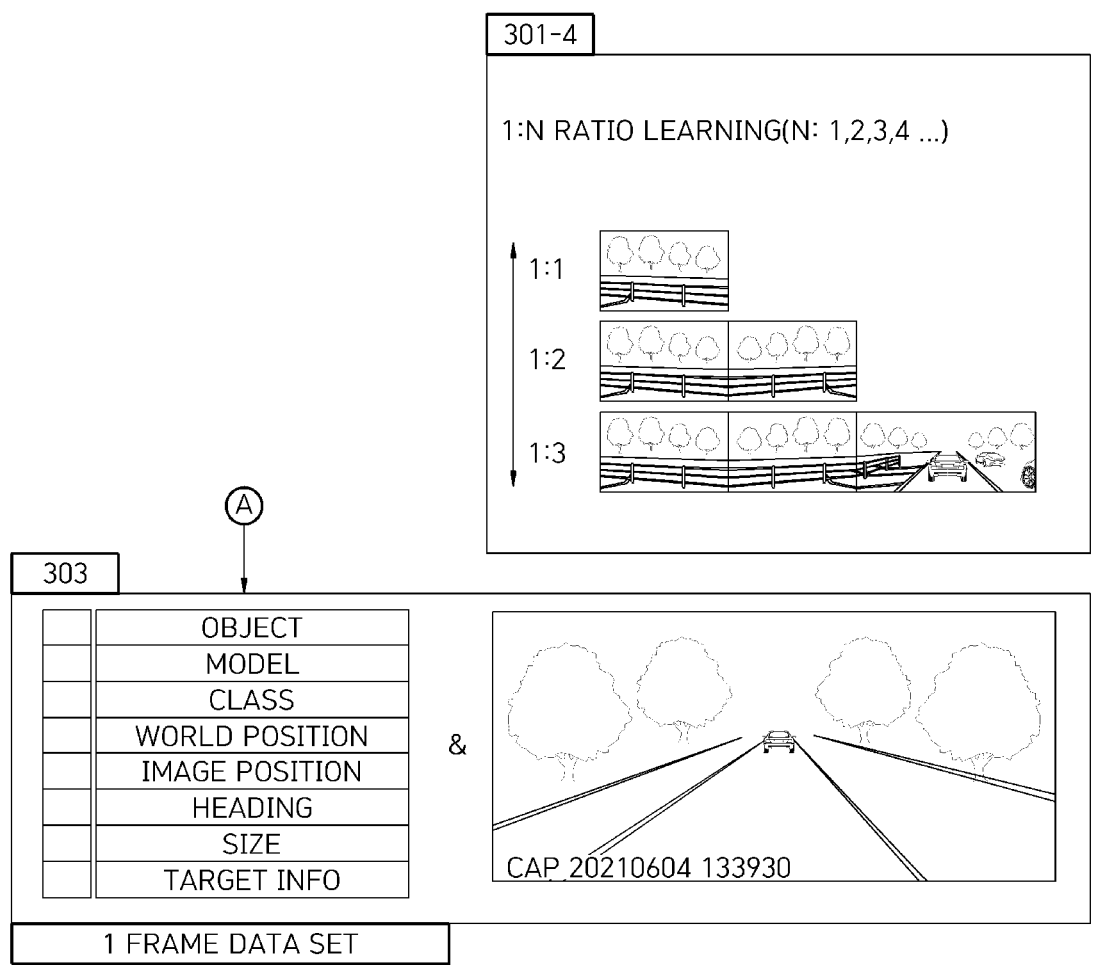
Figure 4A:
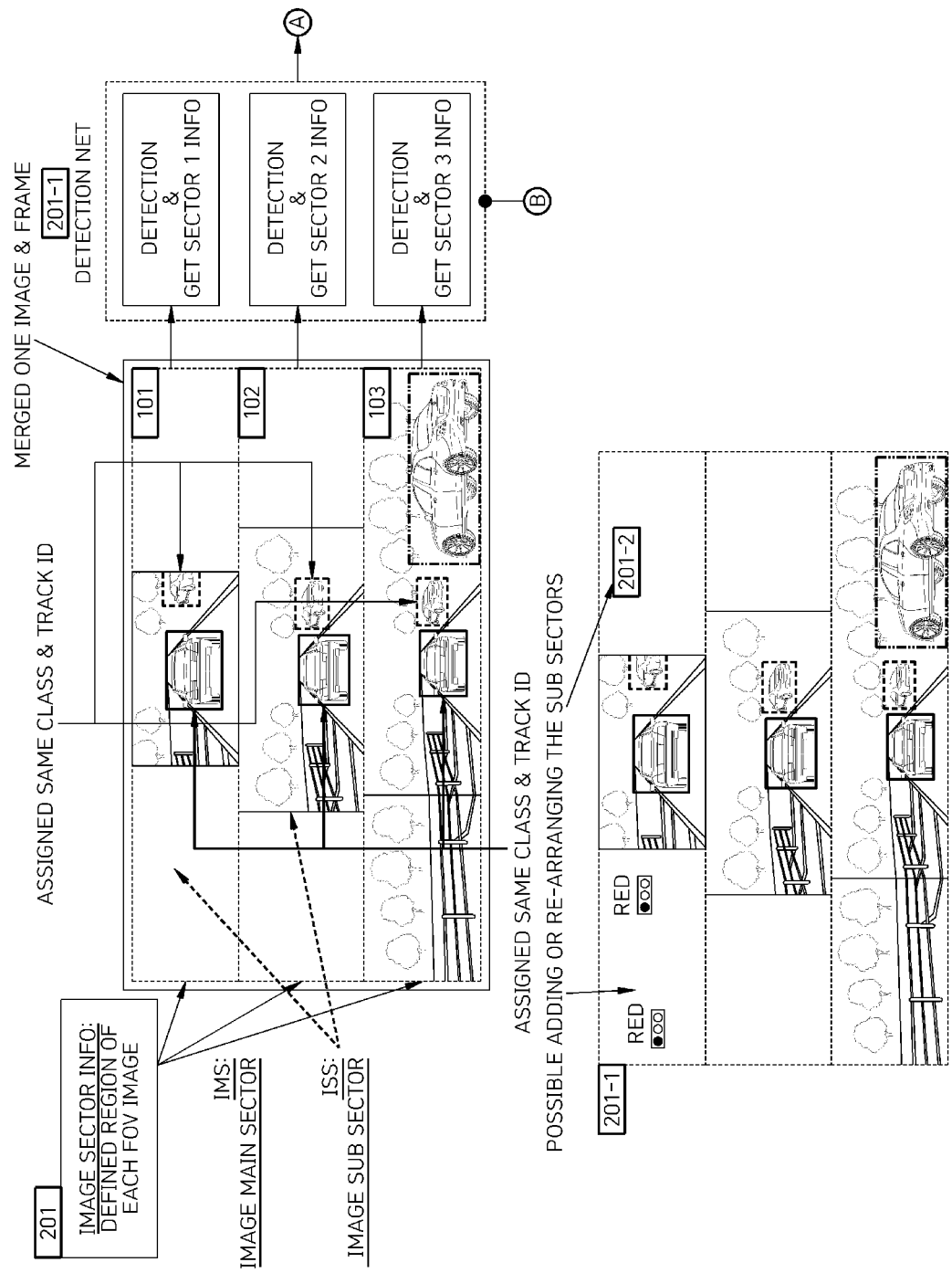
FIGS. 4A to 4D illustrate a multi-rearrangement mergence data learning and estimating process according to an embodiment of the present disclosure.
Figure 4B:
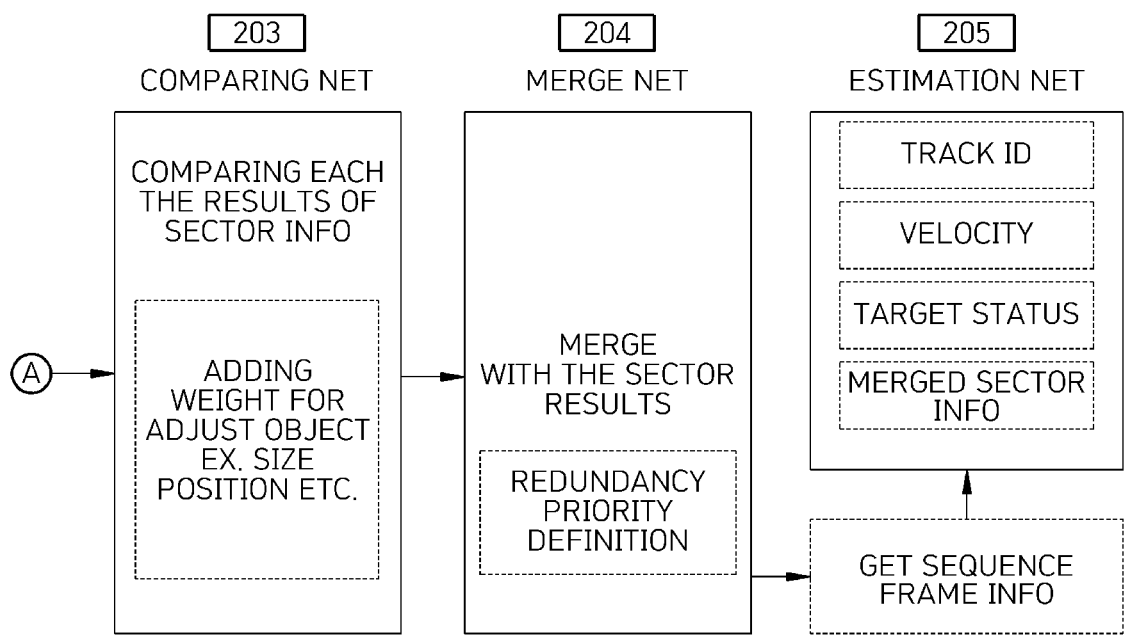
Figure 4C:
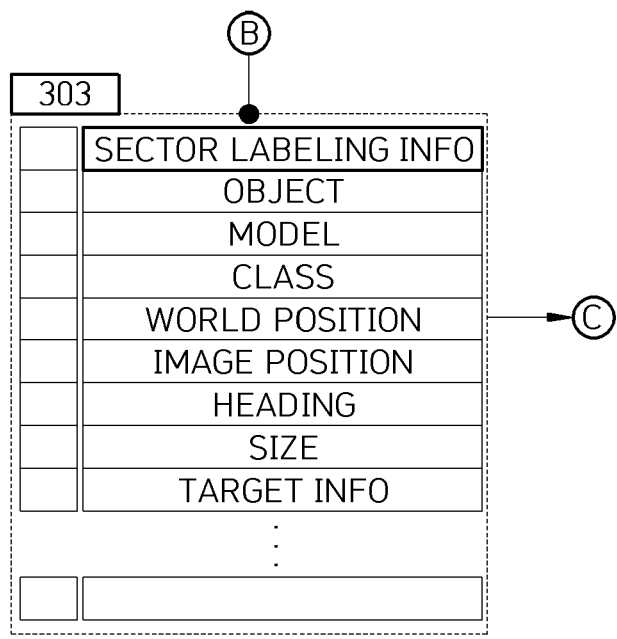
Figure 4D:
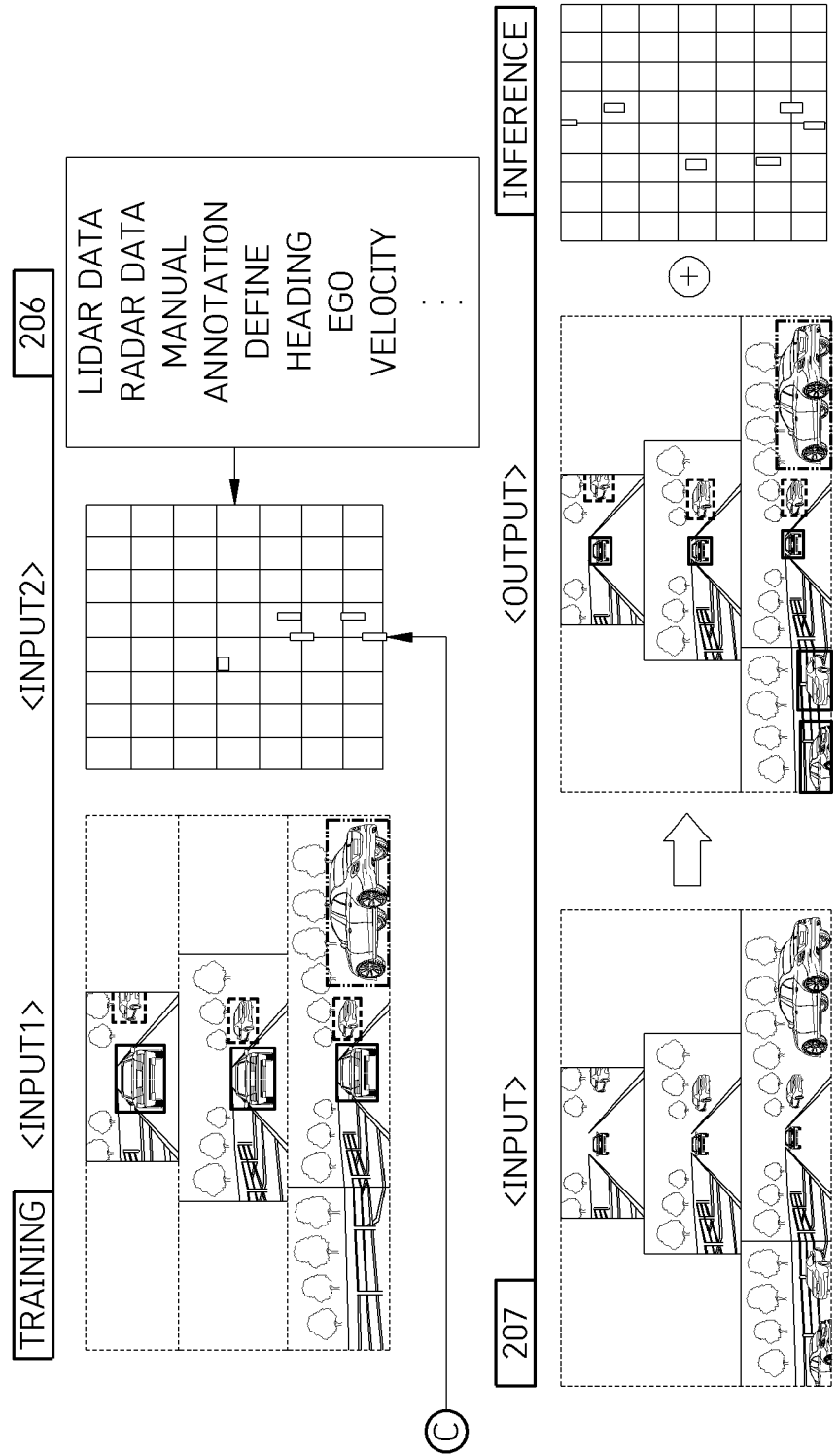

FIGS. 3A and 3B illustrate a multi- and various-sensor mergence tile type data processing process according to an embodiment of the present disclosure. A process of processing and constructing data through dynamic/geometric information mergence for an image and an object corresponding to the image is described below with reference to FIGS. 3A and 3B.

FIGS. 3A and 3B illustrate the merged image described with reference to FIG. 2 as merged image data 301. As illustrated in an 1:N ratio learning image 301-4, merged imaged having various forms may be used as the merged image data 301.

According to an embodiment of the present disclosure, structural data 303 of objects within images is constructed by using the merged image data 301 constructed in the image domain and information mutually calibrated by using distance and position sensors corresponding to the merged image data 301.

An ROI 301-1 of an object is designated in the merged image data 301. Location coordinates 302-1 corresponding to an object candidate group 301-2 detected based on sensor data within the ROI are selected. In this case, coordinate information 301-3 for the bottoms of left and right end points of the ROI is stored. A suitable model 301-2 that has been previously defined based on sensing information within the ROI in the location coordinates 302-1 is selected. The heading 302-3 of the object corresponding to the model 301-2 is defined.

FIGS. 4A to 4D illustrate a multi-rearrangement mergence data learning and estimating process according to an embodiment of the present disclosure. A learning method based on merged data and the final results derived by the learning method are described below with reference to FIGS. 4A to 4D.

FIGS. 4A to 4D illustrate a process of learning and inferring data by dynamically and geometrically merging the data corresponding to objects within an image having a form in which several images have been merged, which has been described with reference to FIG. 2, and within the image described with reference to FIGS. 3A and 3B.

With respect to the data sections of the images displayed in the sections 101, 102, and 103, respectively, a merged image 201 is constituted with an image main sector (IMS) and an image sub-sector (ISS) which may be rearranged in a tile form within the IMS. That is, the IMS basically means that a sector forms a large section for a length or a breadth. The ISS means a space which is redundant or may be rearranged within a section. Information on a region is added to the ISS within the IMS upon data annotation.

An image including traffic light information in addition to the form in which the existing images of the three cameras have been merged is additionally disposed in an additional sub-sector 201-1.

The learning 206 of a merged image and dynamic/geometric information having a tile type according to an embodiment of the present disclosure is performed based on the final learning information that is derived in a process of merging and learning the merged image 201 and the structural data 303 of an object within an image. In real-time inference 207, the final estimation information is secured in a form that includes the structural data 303 of the object within the merged image based on only an merged image input.

With respect to the merged image 201 having the tile type, an object detection network 201-1 learns the structural data 303 of an object within an image, which corresponds to the object to be detected in an image domain corresponding to each of the sections 101, 102, and 103.

A comparing network 203 is a network that compares and merges information of objects corresponding to respective sections, and assigns a weight to information that is detected in each of the sections 101, 102, and 103 based on the size and location of an object.

A merge network 204 merges information on a weight assigned to an object, a location, a size, a type, a model, and a direction, defines priority of redundant information of an object that is derived from each of the sections 101, 102, and 103 based on a weight network, and collects dynamic/geometric information of objects in a mergence domain of one frame.

With respect to results corresponding to a frame that has passed through the merge network 204, information of N frames is stored, and a tracking ID, a speed, and a target state are estimated. Information of a merged sector is collected and used as information for recognizing an autonomous driving environment.

Figure 5:
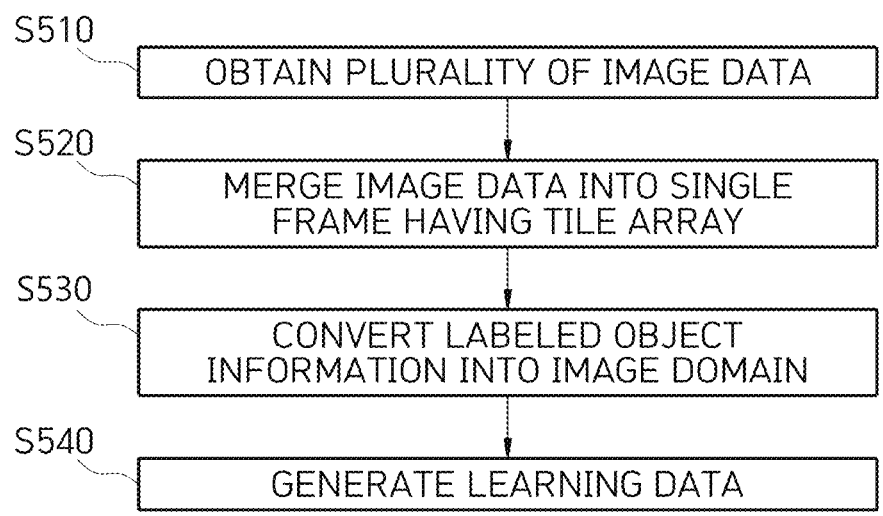
FIG. 5 illustrates a data construction and learning method based on a method of splitting and arranging multiple images according to an embodiment of the present disclosure.

FIG. 5 illustrates a data construction and learning method based on a method of splitting and arranging multiple images according to an embodiment of the present disclosure.

The data construction and learning method based on a method of splitting and arranging multiple images according to an embodiment includes step S510 of obtaining image data photographed by a plurality of cameras, step S520 of merging the image data into a single frame having a tile array, step S530 of converting, into an image domain, object information labeled on an object within the single frame, and step S540 of generating, as learning data, an image converted into the image domain and labeling information of the image domain by merging the image and the labeling information of the image domain.

In step S510, image data is obtained from a plurality of cameras whose photographing information has been set so that the cameras have different FOVs and resolution.

In step S520, data which may be delivered in a learning level is constructed by merging and managing an object that is partially displayed for each section in a single frame, information of an ROI that is displayed in a complete form, and information of an object that is disposed at a long distance and that has a relatively small ROI.

In step S530, object information including object coordinate information in a birds' eye view, form modeling information corresponding to an object size, and moving direction information is converted into an image domain.

In step S540, learning is performed by using structural data of objects within images including information on an object, a model, a class, a position, heading, a size, and a target.

The method according to an embodiment of the present disclosure may be implemented in a computer system or may be recorded on a recording medium. The computer system may include at least one processor, a memory, a user input device, a data communication bus, a user output device, and a repository. The aforementioned components perform data communication with each other through the data communication bus.

The computer system may further include a network interface coupled with a network. The processor may be a central processing unit (CPU) or may be a semiconductor device that processes an instruction stored in the memory and/or the repository.

The memory and the repository may include various forms of volatile or nonvolatile storage media. For example, the memory may include ROM and RAM.

Accordingly, the method according to an embodiment of the present disclosure may be implemented as a computer-executable method. When the method according to an embodiment of the present disclosure is performed in a computer device, computer-readable instructions may perform the method according to an embodiment.

The aforementioned method according to an embodiment may be implemented in a computer-readable recording medium in the form of a computer-readable code. The computer-readable recording medium includes all types of recording media in which data interpretable by a computer system is stored. For example, the computer-readable recording medium may include read only memory (ROM), random access memory (RAM), magnetic tapes, magnetic disks, a flash memory, and optical data storages. Furthermore, the computer-readable recording medium may be distributed to computer systems connected over a computer communication network, and may be stored and executed in the form of a code readable in a distributed manner.

Figure 6:
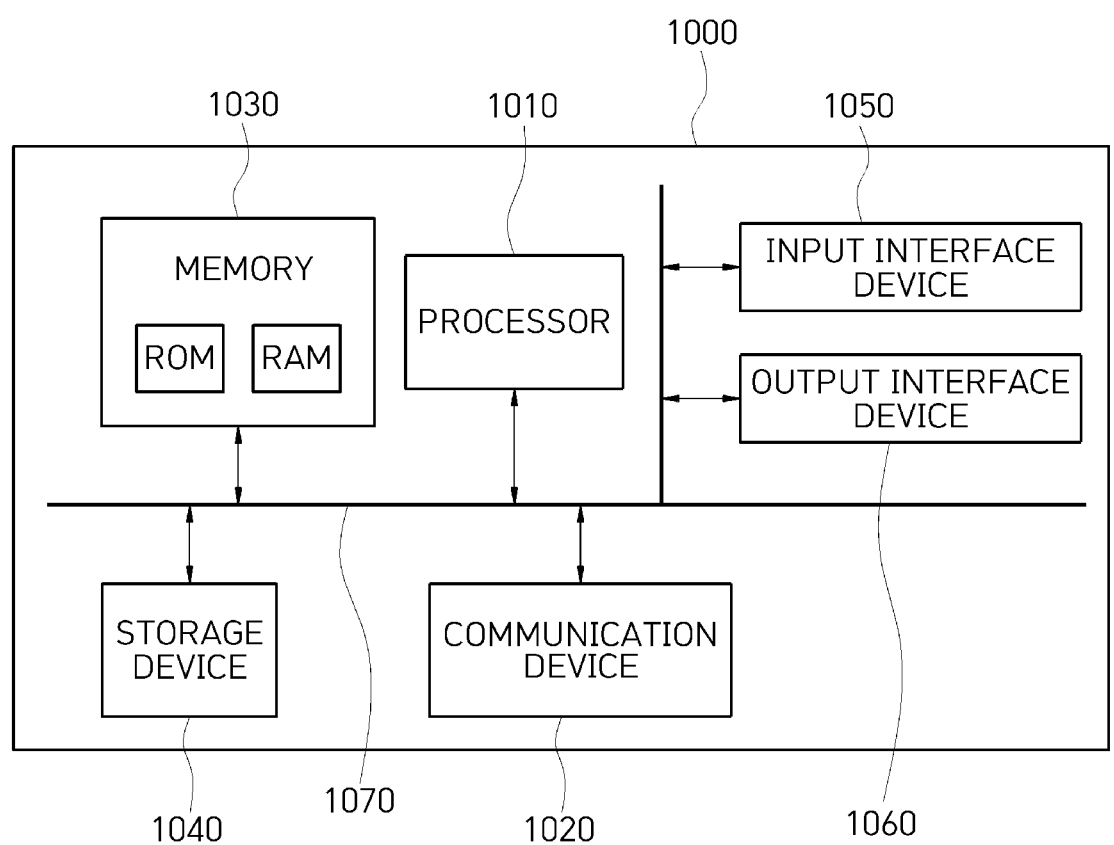
FIG. 6 is a block diagram illustrating a computer system for implementing a method according to an embodiment of the present disclosure.

FIG. 6 is a block diagram illustrating a computer system for implementing the method according to an embodiment of the present disclosure.

Referring to FIG. 6, a computer system 1000 may include at least one of a processor 1010, a memory 1030, an input interface device 1050, an output interface device 1060, and a storage device 1040 which perform communication through a bus 1070. The computer system 1000 may further include a communication device 1020 combined with a network. The processor 1010 may be a central processing unit (CPU) or may be a semiconductor device that executes an instruction stored in the memory 1030 or the storage device 1040. The memory 1030 and the storage device 1040 may include various forms of volatile or nonvolatile storage media. For example, the memory may include read only memory (ROM) and random access memory (RAM). In an embodiment of this specification, the memory may be disposed inside or outside the processor, and the memory may be connected to the processor through various well-known means. The memory includes various forms of volatile or nonvolatile storage media, and may include ROM or RAM, for example.

Accordingly, an embodiment of the present disclosure may be implemented in the form of a method implemented in a computer or may be implemented in the form of a non-transitory computer-readable medium in which a computer-executable instruction has been stored. In an embodiment, when executed in a processor, the computer-readable instruction may perform the method according to at least one aspect of this specification.

The communication device 1020 may transmit or receive a wired signal or a wireless signal.

Furthermore, the method according to an embodiment of the present disclosure may be implemented in the form of a program instruction which may be performed through various computer means, and may be recorded on a computer-readable medium.

The computer-readable medium may include a program instruction, a data file, a data structure, etc. solely or in combination. The program instruction recorded on the computer-readable medium may be specially designed and constructed for an embodiment of the present disclosure or may be known and available to those skilled in the field of computer software. The computer-readable recording medium may include a hardware device configured to store and perform a program instruction. For example, the computer-readable recording medium may include magnetic media such as a hard disk, a floppy disk, and a magnetic tape, optical media such as CD-ROM and a DVD, magneto-optical media such as a floptical disk, ROM, RAM, a flash memory. The program instruction may include not only a machine language code that is produced by a compiler, but a high-level language code executable by a computer through an interpreter, etc.

The embodiments of the present disclosure have been described in detail, but the scope of a right of the present disclosure is not limited thereto. A variety of modifications and changes of those skilled in the art using the basic concept of the present disclosure defined in the appended claims are also included in the scope of a right of the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium.

The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A data construction and learning system based on a method of splitting and arranging multiple images, the system comprising:
   a processor having an input that receives images captured by a plurality of cameras disposed in a vehicle; and
   a memory that stores a program for merging the images into a single image and estimating information on a road situation and an object; and
   wherein the processor executes the program,
   wherein the processor merges and recognizes, as one situation, road situations and objects redundantly included in the images,
   wherein the input receives images having different field of views (FOVs) from the plurality of cameras,
   wherein the processor constructs the single image in which the images are disposed for each section by rearranging and merging the images having the different FOVs, and
   wherein the processor constructs data to be delivered in a learning level in a way to merge and manage information of an object that is partially displayed for each section and whose region of interest (ROI) is fully displayed and becomes relatively small by performing annotation on the object within the single image.

2. The system of claim 1, wherein:
   the processor constructs structural data of objects within images by using the single image and calibrated information based on a distance sensor and a position sensor, and the structural data comprises information of an object, a model, a class, a position, heading, a size, and a target.

3. The system of claim 2, wherein the processor
merges the images into the single image comprising an image main sector and an image sub-sector, and
outputs final estimation information based on only a merged image input upon real-time execution by using learning results using the structural data of the objects within the images.

4. A data construction and learning method based on a method of splitting and arranging multiple images, which is performed by a data construction and learning system based on a method of splitting and arranging multiple images, the method comprising steps of:
(a) obtaining image data photographed by a plurality of cameras;
(b) merging the image data into a single frame having a tile array;
(c) converting, into an image domain, object information labeled on an object within the single frame; and
(d) generating learning data by merging an image converted into the image domain and labeling information of the image domain, wherein the step (b) comprises constructing the data capable of being delivered in a learning level by merging and managing an object partially displayed in the single frame for each section, information of a region of interest (ROI) displayed in a complete form, and information of an object that is disposed at a long distance and that has a relatively small ROI.

5. The method of claim 4, wherein the step (a) comprises obtaining the image data from the plurality of cameras whose photographing information has been set so that the cameras have different field or views (FOVs) and resolution.

6. The method of claim 4, wherein the step (c) comprises converting, into the image domain, the object information comprising object coordinate information in a birds' eye view, form modeling information corresponding to an object size, and moving direction information.

7. The method of claim 4, wherein the step (d) comprises performing learning using structural data of objects within images comprising information of an object, a model, a class, a position, heading, a size, and a target.

* * * * *